US007140006B2

(12) United States Patent
Harrison, III et al.

(10) Patent No.: US 7,140,006 B2
(45) Date of Patent: Nov. 21, 2006

(54) METHOD AND APPARATUS FOR OPTIMIZING CODE

(75) Inventors: Williams L. Harrison, III, Brookline, MA (US); Cotton Seed, Brookline, MA (US)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 09/976,220

(22) Filed: Oct. 11, 2001

(65) Prior Publication Data

US 2003/0101441 A1 May 29, 2003

(51) Int. Cl.
*G06F 9/45* (2006.01)
(52) U.S. Cl. ............... 717/152; 717/154; 717/153; 717/151; 717/145
(58) Field of Classification Search ........ 717/100–178
See application file for complete search history.

(56) References Cited

U.S. PATENT DOCUMENTS

| 6,026,241 | A | * | 2/2000 | Chow et al. ............ 717/152 |
| 6,182,284 | B1 | * | 1/2001 | Sreedhar et al. ......... 717/146 |
| 6,249,910 | B1 | * | 6/2001 | Ju et al. .................. 717/146 |
| 6,651,247 | B1 | * | 11/2003 | Srinivasan .............. 717/161 |
| 2002/0095667 | A1 | * | 7/2002 | Archambault ........... 717/154 |
| 2002/0124239 | A1 | * | 9/2002 | Nelson .................... 717/140 |
| 2003/0023959 | A1 | * | 1/2003 | Park ........................ 717/151 |

OTHER PUBLICATIONS

Visser et al., Building Program Optimizers with Rewriting Strategies, ACM, 1998.*
Antoy et al., A Needed Narrowing Strategy, ACM, Jul. 2000.*
Moreau et al., Compilation of Associative-Commutative Normalisation with Strategies in ELAN, 1998.*
Fokkink et al., Within ARM's Reach: Compilation of Left-Linear Rewrite Systems Via Minimal Rewrite Systems, ACM, 1998.*
Moreau et al., A Compiler for Rewrite Programs in Associative-Commutative Theories, 1998.*
Younqiang et al., The Design And Implementation of a Program Development System Based on Rewriting Method., ACM, 1997.*
Ogata et al., Optimizing Term Rewriting using Discrimination Nets with Specialization, ACM, 1998.*
Schupp et al., User-extensible Simplification—Type-based Optimizer Generators, Apr. 2001.*
Cherniack et al., Changing the Rules: Transformations for Rule-Based Optimizers, ACM, 1998.*
Fahringer, "Symbolic Expression Evaluation to Support Parallelizing Compilers," Jan. 1997.*
Field et al., "Parametric Program Slicing," ACM, 1995.*

* cited by examiner

*Primary Examiner*—Kakali Chaki
*Assistant Examiner*—Insun Kang
(74) *Attorney, Agent, or Firm*—Blakely, Sokoloff, Taylor & Zafman LLP

(57) ABSTRACT

The invention provides a method and apparatus for optimizing code. Embodiments of the present invention comprise, for each expression in an intermediate program representation, transparently forwarding definitions of variables in said expression as said expression is being parsed by a term rewriter, the intermediate program representation being left unchanged; determining whether a term rewriting rule exists in the term rewriter for said expression; and rewriting said expression in the intermediate program representation according to said rule.

28 Claims, 3 Drawing Sheets

METHOD AND APPARATUS FOR OPTIMIZING CODE

FIELD OF THE INVENTION

This invention relates to code optimization. In particular, it relates to code optimization using algebraic simplification. Even more particularly, it relates to term rewriting in optimizing compilers.

BACKGROUND

In compiling a source program written in a high level language to target program written in a low level language, optimizing compilers perform certain optimizing transformations. Such transformations are applied to an intermediate program representation of the source program in an intermediate language. One such transformation includes algebraic simplification wherein complex expressions in the intermediate program representation are replaced with simpler expressions. Optimizing compilers perform algebraic simplification using a term rewriting system which embodies a set of rules defining conditions under which matched terms in the intermediate program representation may be replaced.

A problem with such term rewriting systems occurs when an expression in the intermediate program representation feeds several others using assignments to variables. For example, consider the following simple program:

$a=b+c;$ if $(n<10)$ $d=a-b;$ else $e=a-c;$

This program may be simplified so that the assignments to d become d=c and the assignment to e becomes e=b. That this simplification is possible is evident when the program is transformed as follows:

$d=(b+c)-b;$ else $e=(b+c)-c;$

Assuming the term rewriting system uses rules such as $(X+Y)-X \rightarrow Y$ $(X+Y)-Y \rightarrow X$ Then it is apparent that these rules are applicable once variable "a" has been eliminated by substitution of its right hand side into its uses. The problem in the above example is that in order to trigger the term rewriting rules the program would have to be transformed as described. This could be achieved by performing a comprehensive forward substitution in which variables in the right hand side of expressions are replaced with the full sub expressions. Performing such a comprehensive forward substitution prior to rewriting would enlarge trees seen by the rewriting system making it impractical. Moreover, such a comprehensive forward substitution does not address whether the term rewriting rules would in fact apply after forward substitution, resulting in redundant computation in some cases with no benefit.

DETAILED DESCRIPTION

Figure 1:
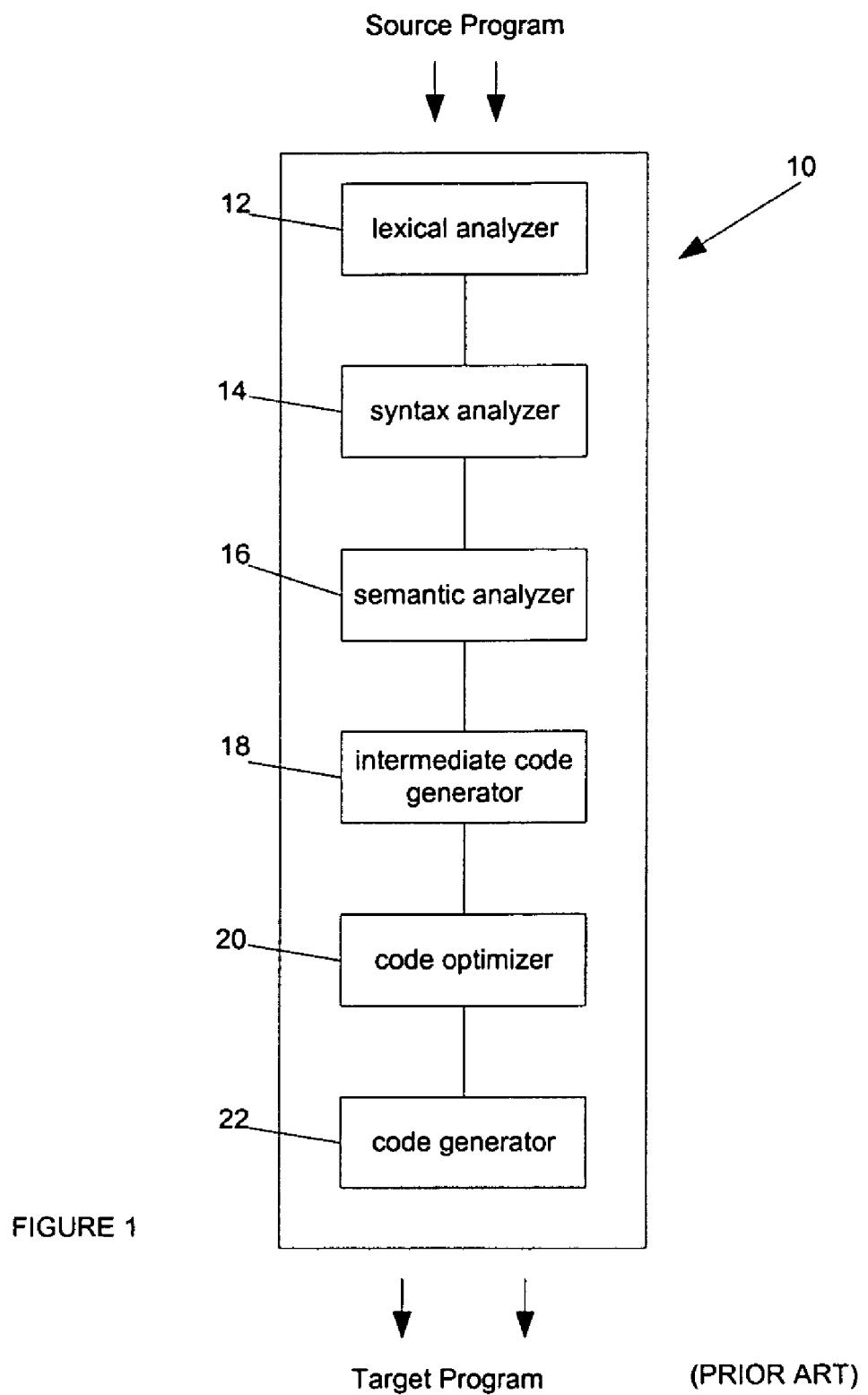
FIG. 1 shows a schematic drawing of an optimizing compiler in which embodiments of the invention may be practiced.

FIG. 1 of the drawings shows an optimizing compiler 10 in which embodiments of the invention may be practiced. The optimizing compiler 10 includes a lexical analyzer 12 which takes a source program and breaks it up to meaningful units called tokens. A syntax analyzer 14 determines the structure of the program and of the individual statements therein by grouping the tokens into grammatical phrases which are then checked by a semantic analyzer 16 for semantic errors. The compiler 10 further includes an intermediate code generator 18 which generates an intermediate program representation of the source program in an intermediate language. A code optimizer 20 attempts to optimizer program representation. The final phase of the compiler 10 is carried out by a code generator 22 which generates target comprising machine or assembly code.

One form of code optimization performed by the code optimizer 20 is known as algebraic simplification, where complex algebraic expressions in the intermediate program representation are replaced with simpler expressions. Term rewriting is a particular form of algebraic simplification in which less simplified terms in the intermediate program representation are rewritten into more simplified terms.

The present invention extends the power of the code optimizer 20 to do term rewriting. The invention uses a partial Single Static Assignment (SSA) form (see below) to create an illusion of forward substitution without growth in the intermediate language. The invention extends the power of a term rewriter when applied to an intermediate language and can be used for both matching and replacement of terms. In accordance with the invention, terms are copied only when rules are actually applicable, so that forward substitution only occurs when a rewriting rule exists.

For purposes of describing the present invention, it is assumed that assignment statements in the intermediate language have the following syntax:

E: (PUTV E)
   | (INTEGER Z)
   | (ADD E E)
   | (SUB E E)
   |(GET V)
V: variable
Z: integer It is assumed further that INTEGER, ADD, SUB, and GET expressions all have the same type; the exact nature of the type (e.g., how many bits) is irrelevant. An assignment statement must be a PUT expression, and a PUT expression cannot be the subexpression of another subexpression.

(PUT V E): This statement writes a value to a variable. The expression E gives the value which is written to the location. V specifies a variable. It is assumed that variables are named by integers, and that other than to distinguish one variable from another, these integer names have no significance. It is also assumed that there is no aliasing or overlap among the variables used in PUT and GET expressions.

(INTEGER Z): This is the expression for an integer constant. Z is an integer literal that gives the value of the constant.

(ADD E E): This expression returns the sum of its arguments.

(SUB E E): This expression returns the difference of its arguments.

(GET V): This expression reads from the variable named by V and returns its value.

It is assumed that there are control flow primitives in the intermediate language for branching, conditional branching etc. The exact details of these primitives are not relevant for purposes of describing the invention.

In accordance with embodiments of the present invention, the intermediate program representation is first put into SSA form. A variable v is an SSA variable if there is exactly one PUT to v in the program and if this PUT dominates all GETs of the v (i.e., every GET of v is in a statement that is dominated by and distinct from the single PUT of v). This definition partitions the variables of the program into two classes, the SSA variables and the non-SSA variables. A program is in partial SSA form if for every SSA variable v, RHS(v) gives the right-hand side of the assignment to v. In other words, if the assignment to v is (PUT v E) then RHS(v)=E. If v is an SSA variable, an expression of the form (GET v) is referred to as an SSA GET, and an expression of the form (PUT v X) as an SSA PUT. Similarly, GETs and PUTs of a non-SSA variable are referred to as non-SSA GETs and PUTs.

It is assumed that the term rewriter is written using the following operations on the intermediate language:
First(E):E
Second(E):E
IsAdd(E):boolean
IsSub(E):boolean
IsPut(E):boolean
IsGet(E):boolean
IsInteger(E):boolean
Replace(E,E)

The operation First returns the first subexpression of its argument. For example, First((ADD (GET 10) (INTEGER 1)))=(GET 10). The operation Second returns the second subexpression of its argument. First is undefined if its argument has no subexpression, and Second is undefined if its argument does not have two subexpressions.

The predicates IsAdd, IsSub, IsPut, IsGet, and IsInteger take an expression and return true if it is an ADD, SUB, PUT, GET, or INTEGER expression respectively, and false otherwise, for example, IsInteger((ADD X Y))=false but IsInteger( (INTEGER 10))=true.

The operation Replace modifies the intermediate language program by replacing its first argument by its second argument in the program. Replace has no return value, it is used only for its effect on the program. It is assumed that well-formed programs are transformed into other well-formed programs by the rewriter (i.e., PUT expressions are not replaced by ADD expressions).

The rewriter uses First and Second to walk over or parse an expression as it attempts to match the expression to the left hand side of a rule. It uses IsAdd, IsSub, etc. to examine the keywords of the expressions it encounters during its traversal. It uses Replace to replace the matched assignment by the expression generated by the right hand side of a rule. It is assumed that First and Second are the only means by which the rewriter can descend into the subexpressions of an expression that it is matching and that IsAdd, IsSub, etc. are the only means by which the rewriter can query the keywords of expressions. Likewise, it is assumed that Replace is the only means by which the rewriter modifies the program.

Figure 2:
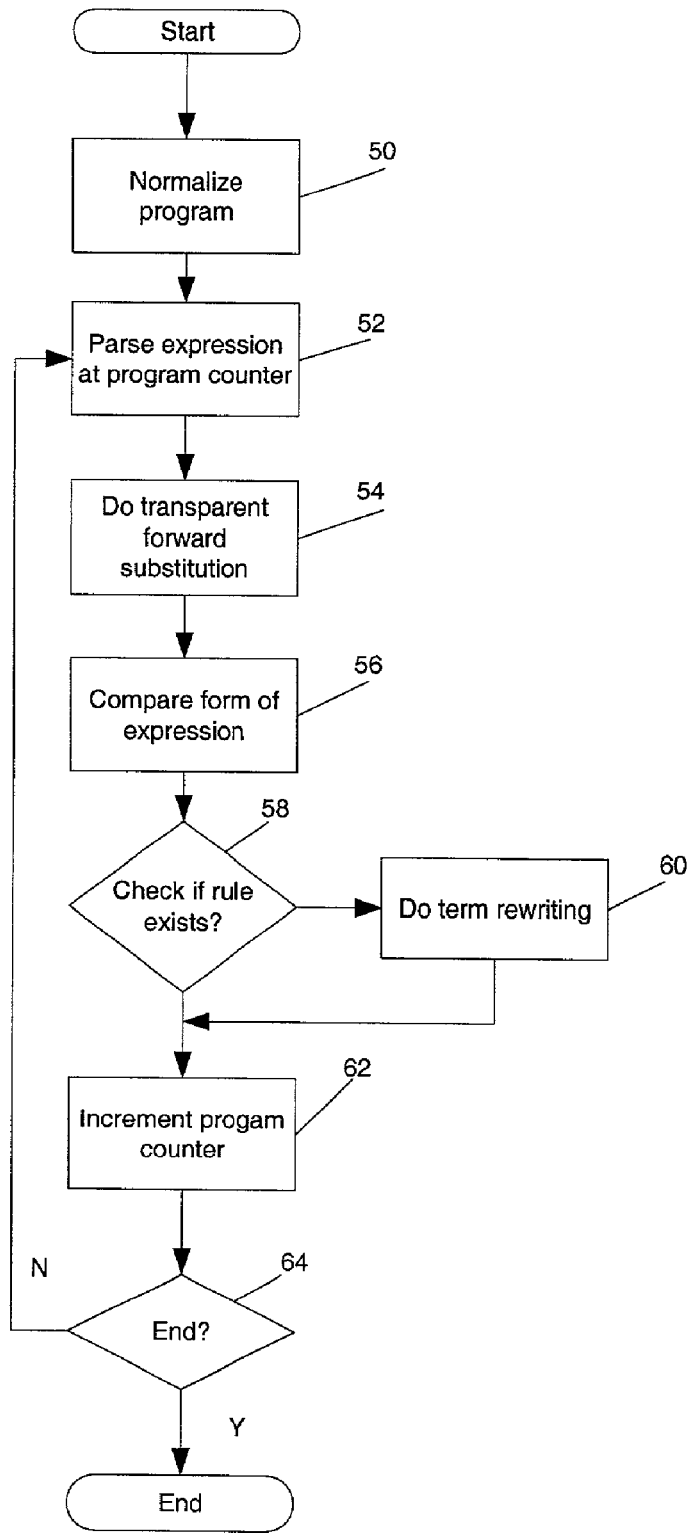
FIG. 2 shows a flowchart illustrating term rewriting according to one embodiment of the invention.

FIG. 2 of the drawings shows a flow chart illustrating term rewriting according to one embodiment of the invention. Referring to FIG. 2 at block 50 the intermediate language program is normalized so that it obeys the following conditions:

C1: every non-SSA PUT expression in the program has an SSA GET as its only subexpression;
C2: every non-SSA GET expression in the program is the only subexpression of an SSA PUT; and
C3: every ADD and SUB expression in the program has an SSA GET as each of its subexpressions In other words, expressions have the minimum nesting possible, and references to non-SSA variables are restricted to copies to and from SSA variables. These conditions can be achieved by the introduction of temporary SSA variables.

At block 52 the term rewriter parses an expression in the intermediate program language which is pointed to by a program counter. At block 54 variables occurring in the right hand side of said expression are transparently forwarded to the term rewriter. This creates an illusion of forward substitution to the term rewriter where the expressions seen by the term rewriter appear to be forward substituted, but the intermediate language is left unchanged.

In order to transparently forward terms to the term rewriter an operation called Forward is used. Forward (E):E takes an expression and returns another expression. It simply returns its input in all but one case. When its input is an SSA GET of variable v, and when RHS(v) is anything other than a non-SSA GET, then it returns Forward(RHS(v)). Forward traverses chains of SSA GET/PUT pairs until it reaches a non-SSA GET (or one that cannot safely be forward substituted away).

Forward assumes that conditions C1, C2, and C3 hold for the program it is operating on. If these conditions do not hold then it may return an incorrect result (an expression that it not equivalent to its input) or it may have the effect of forward substituting too large an expression (i.e., more "levels" of ADD and SUB operators than the minimum required).

Forward maintains a set, called Forwarded, of the SSA GET expressions that have been forwarded through, for the sake of a subsequent operation called Freeze. Forward can be defined in pseudocode as follows:

```
Forward(e) =
    case e of
    (GET v):
        if v is an SSA variable
            let f = RHS(v)
            if f = (GET u) where u is a non-SSA variable
                return e
            else
                Forwarded += e
                return f
            endif
        else
            return e
        endif
    default:
        return e
end Forward
```

For the purposes of membership in Forwarded, two expressions that are syntactically identical but that occupy different positions in a larger expression are considered distinct (not equal). Thus, in the expression (ADD (GET v) (GET v)) there are two expressions of the form (GET v) and either or both of them may be members of Forwarded.

Forward does not traverse an SSA GET when the right hand side of the SSA variable is a non-SSA GET. In general, the non-SSA GET will not return the same value as the SSA GET, because the non-SSA variable may be assigned between the SSA PUT and the SSA GET. By way of development, the power of Forward may be improved by providing it with dependence information that tells it when a non-SSA GET can be safely forwarded. This allows certain kinds of patterns to be matched—for example, expressions of the form (PUT v (ADD (GET v) (INTEGER 1)))

where the left and right hand variables are the same—which cannot be matched otherwise (note that v cannot be an SSA variable according to the definition of partial SSA form).

The term rewriter compares the form of the expression, at block 56, against forms of expressions in the term rewriter for which rewriting rules exist. For example, the rewriter may have a rule which takes an expression in the form (ADD X X) and rewrites it to (MUL X 2), which multiplies X by 2. In the case of nested expressions, certain variables are selectively not transparently forward substituted where the result of comparing other terms in said nested expressions indicates that no rewriting rule exists for said expression. At block 58 a determination is made as to whether a rewriting rule exists, a full match indicating that a rule exists. At block 60 a term rewriting transformation of the intermediate program language is performed. This is achieved by an operation Freeze which takes an expression and returns another, equivalent expression, in which all forwarding operations that are recorded in Forwarded are translated into forward substitutions in the original expression. For example, given the program (PUT c (ADD (GET a) (GET b)))
(PUT d (SUB (GET a) (GET b)))
(PUT e (ADD (GET c) (GET d)))

where Forwarded contains (GET c) and (GET d), the result of

Freeze((ADD (GET c) (GET d)))

is (ADD (ADD (GET a) (GET b)) (SUB (GET a) (GET b))).

It is assumed that the argument to Freeze is the very instance of the expression (ADD (GET c) (GET d)) that is on the right-hand side of the assignment to variable e. Freeze is defined in pseudocode as follows:

```
Freeze (e) ≡
    case e of
    (GET v):
        if e ∈ Forwarded then
            return Freeze(RHS(v))
        else
            return (GET v)
        endif
    (ADD X Y):
        let x = Freeze(X)
        let y = Freeze(Y)
        return (ADD x y)
    (SUB X Y):
        let x = Freeze(X)
        let y = Freeze(Y)
        return (SUB x y)
    (PUT v X):
        let x = Freeze(X)
```

-continued

```
        return (PUT v x)
    (INTEGER z):
        return (INTEGER z)
end Freeze
```

Thus by calling Freeze on an expression, the expression is rewritten so that variables therein are forward substituted with the associated definitions of said variables. The forward substitution results in rewriting the intermediate program representation. Part of doing term rewriting at block 60 also includes determining whether an alternative expression exists in the rewriter for said expression and replacing said expression in the intermediate program language with said alternative expression if it exists. For example, (MUL X 2) would be an alternative expression for (ADD X X). Freeze assumes that the program obeys conditions C1, C2, and C3, but an expression returned by Freeze does not obey these conditions. Hence term rewriting also includes rewriting the expression to a minimally nested form in which expressions on either side of an operator are condensed into simple named variables and in which references to non-SSA variables are restricted to copies to and from SSA variables. In other words, the expression is written to a form in which it obeys conditions C1, C2 and C3. An operation chop is called to do this.

The operation Chop takes an expression and returns a semantically equivalent one. Chop assumes that a variable CurrentStatement points to the "root" assignment statement being operated on by the rewriter. If for example the outermost term being matched (and possibly rewritten) by the rewriter is the right-hand side of the assignment (PUT v R), then CurrentStatement would point to this assignment statement. Chop uses this as an insertion point for new statements, which must be executed just prior to the current statement. Chop takes an expression for which conditions C1, C2, and C3 may not hold and returns an expression for which they do hold. Chop is defined in pseudocode as follows:

```
Chop (e) ≡
    case e of
    (PUT v X):
        let x = Chop(x)
        return (PUT v x)
    (ADD X Y):
        let x = Chop(x)
        let y = Chop(y)
        let u = GenSSA( )
        InsertBefore(CurrentStatement, (PUT u (ADD x y)))
        return (GET u)
    (SUB X Y):
        let x = Chop(x)
        let y = Chop(y)
        let u = GenSSA( )
        InsertBefore(CurrentStatement, (PUT u (SUB x y)))
        return (GET u)
    (GET v):
        if v is an SSA variable
            return (GET v)
        else
            let u = GenSSA( )
            InsertBefore(CurrentStatement, (PUT u (GET v)))
            return (GET u)
        endif
    (INTEGER z):
        let u = GenSSA( )
        InsertBefore(CurrentStatement, (PUT u (INTEGER z)))
```

```
                return (GET u)
end Chop
```

The operation InsertBefore inserts its second argument into the control flow of the program immediately before its first argument. Both arguments are PUT expressions.

At block 62, the program counter (CurrentStatement) is incremented

At block 64 a check is made to determine if CurrentStatement points to the last statement in the program. If the CurrentStatement points to the last statement then the process is ended otherwise block 52 is performed again.

It will be appreciated that the primitives of rewriter described above may be redefined as follows to perform the method illustrated in FIG. 2 of the drawings:

First'(e)=First(Forward(e))
Second'(e)=Second(Forward(e))
IsPut'(e)=IsPut(Forward(e))
IsAdd'(e)=IsAdd(Forward(e))
IsSub'(e)=IsSub(Forward(e))
IsGet'(e)=IsGet(Forward(e))
IsInteger'(e)=IsInteger(Foward(e))
Replace'(e, f)=Replace(e, Chop(Freeze(f)))

A rewriter using the forwarding/freezing versions of the primitives defined above will match expressions which appear to have been forward substituted perform replacements that leave the program in the required state (that is, obeying conditions C1, C2, and C3) for further matching and rewriting of the newly introduced expressions.

Phi functions used in conventional SSA forms are context-sensitive and cannot be freely forward substituted because they are associated with a particular conditional structure in the program and are not free to move. This can be remedied by using a context-free selection operator in place of phi. For example, an expression of the form (MUX C X Y)

where C is a boolean expression that is used to select between X and Y (X is selected when C is false, Y when C is true). This operator can be freely forward substituted in accordance with the invention, and when it is used in place of a conventional phi function it can be given the same status as ADD and SUB have been given above. This MUX operation evaluates both X and Y and hence lacks the "short-circuited" behavior of the original conditional; therefore, MUXes should be introduced judiciously.

If the intermediate language is enriched to include operators and storage access operations (e.g., memory reads) beyond those in the example language described above, by considering the circumstances under which the variables can be safely forward substituted the method of term writing described can be used. Under these circumstances, Forward can be made to traverse from a GET to a PUT of an SSA variable that has such an operator in its right hand side.

It will be appreciated that Freeze can be used without Chop to implement a rewriter that takes a program that has been chopped (i.e., obeys C1, C2, and C3) and that creates from it a program where matched terms are frozen but not chopped. To accomplish this, a modified Replace is used which is defined as Replace'(e, f)=Replace(e, Freeze(f))

The frozen terms that are introduced into the program by this variant of Replace are not suitable for further forwarding and freezing but will have the property that they are matched by the original rewriter, i.e., the rewriter that does not use forwarding, freezing, and chopping versions of the primitives First, Second, IsAdd, etc.

Figure 3:
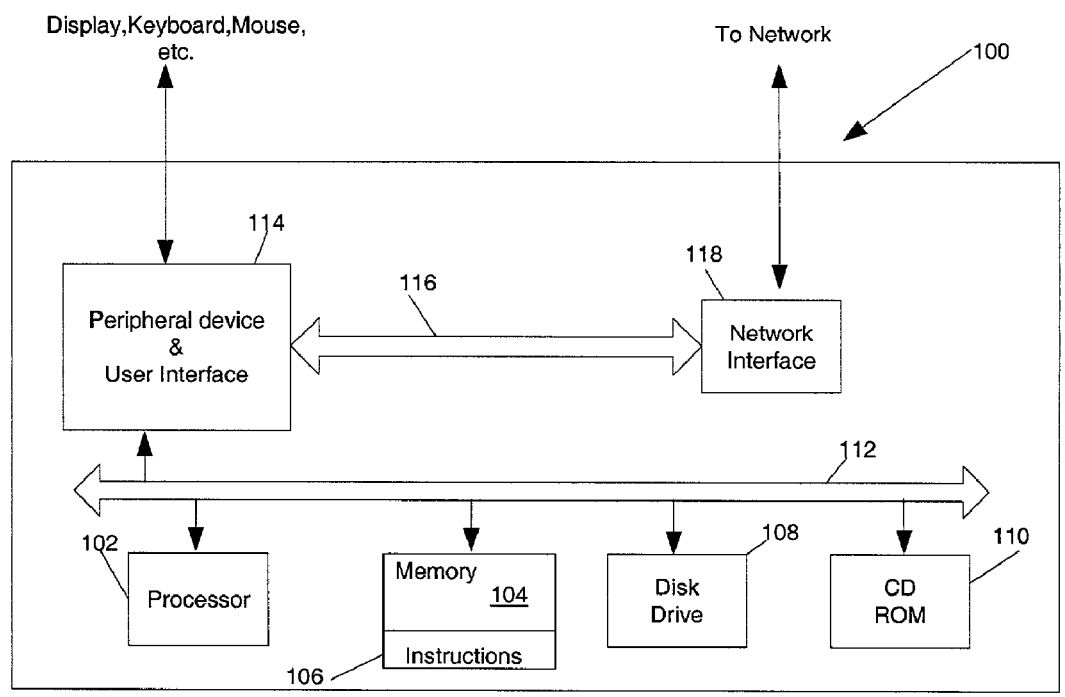
FIG. 3 shows a schematic drawing of hardware for performing term rewriting in accordance with the invention.

Referring to FIG. 3 of the drawings reference numeral 100 generally indicates hardware for performing term rewriting in accordance with the invention. The hardware 100 includes a memory 104, which may represent one or more physical memory devices, which may include any type of random access memory (RAM) read only memory (ROM) (which may be programmable), flash memory, non-volatile mass storage device, or a combination of such memory devices. The memory 104 is connected via a system bus 112 to a processor 102. The memory 104 includes instructions 106 which when executed by the processor 102 cause the processor to perform the methodology of the invention as discussed above. Additionally the system 100 includes a disk drive 108 and a CD ROM drive 110 each of which is coupled to a peripheral-device and user-interface 114 via bus 112. Processor 102, memory 104, disk drive 108 and CD ROM 110 are generally known in the art. Peripheral-device and user-interface 114 provides an interface between system bus 112 and various components connected to a peripheral bus 116 as well as to user interface components, such as display, mouse and other user interface devices. A network interface 118 is coupled to peripheral bus 116 and provides network connectivity to system 100.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other form of propogated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the techniques are not limited to any specific combination of hardware circuitry and software.

Although the present invention has been described with reference to specific exemplary embodiments, it will be evident that various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
for each expression in an intermediate program representation, applying a transparent term forwarding function to the expression as it is being parsed by a term rewriter, wherein said forwarding function operates on SSA GET expressions, recursively traversing the chain of SSA GET/PUT pairs associated with the expression in the intermediate program representation until a terminating expression is reached, the intermediate program representation being left unchanged;
maintaining a set of expressions that have been forwarded using said transparent forwarding function;
determining whether a term rewriting rule exists in the term rewriter for said expression; and
rewriting said expression in the intermediate program representation according to said rule.

2. The method of claim 1 wherein determining whether a term rewriting rule exists comprises comparing the form of said expression against forms of expressions in the term rewriter for which rewriting rules exist.

3. The method of claim 2 wherein said transparently forwarding variables in said expression is selectively not performed for some variables where the result of comparing parts of the form of said expression indicates that no rewriting rule exists for said expression.

4. The method of claim 1 further comprising first normalizing the intermediate program representation to a form in which uses of variables in expressions can be safely forward substituted with associated definitions of said variables without affecting the logic of the intermediate program representation.

5. The method of claim 4, wherein normalizing the intermediate program representation comprises modifying each expression to a minimally nested form in which references to non-SSA variables are restricted to copies to and from SSA variables.

6. The method of claim 4, wherein rewriting said expression comprises forward substituting uses of variables therein with associated definitions of said variables;
said forward substitution taking place in the intermediate language representation using said rule in the term rewriter to determine whether an alternative expression exists in the rewriter for said expression; and replacing said expression m the intermediate program language with said alternative expression if it exists.

7. The method of claim 6 wherein said expression is rewritten to a minimally nested form in which references to non-SSA variables are restricted to copies to and from SSA variables.

8. A machine-readable medium that provides instructions, which when executed by a processor, cause the processor to perform operations comprising:
for each expression in an intermediate program representation, applying a transparent term forwarding function to the expression as it is being parsed by a term rewriter, wherein said forwarding function operates on SSA GET expressions, recursively traversing the chain of SSA GET/PUT pairs associated with the expression in the intermediate program representation until a terminating expression is reached, the intermediate program representation being left unchanged;
maintaining a set of expressions that have been forwarded using said transparent forwarding function;
determining whether a term rewriting rule exists in the term rewriter for said expression; and
rewriting said expression in the intermediate program representation according to said rule.

9. The machine-readable medium of claim 8, wherein determining whether a term rewriting rule exists comprises comparing the form of said expression against forms of expressions in the term rewriter for which rewriting rules exist.

10. The machine-readable medium of claim 9 wherein said transparently forwarding variables in said expression is selectively not performed for some variables where the result of comparing parts of the form of said expression indicates that no rewriting exists for said expression.

11. The machine-readable medium of claim 8, wherein said operations further comprise first normalizing the intermediate program representation to a form in which uses of variables in expressions can be safely forward substituted with the associated definitions of said variables without effecting the logic of the intermediate program representation.

12. The machine-readable medium of claim 11 wherein normalizing the intermediate program representation comprises modifying each expression therein to a minimally nested form in which references to non-SSA variables are restricted to copies to and from SSA variables.

13. The machine-readable medium of claim 11 wherein rewriting said expression comprises forward substituting uses of variables therein with associated definitions of said variables, said forward substitution taking place in the intermediate language representation; using said rule in the term rewriting to determine whether an alternative expression exists in the rewriter for said expression; and replacing said expression in the intermediate program language with said alterative expression if it exists.

14. The machine-readable medium of claim 13 wherein said expression is rewritten to a minimally nested form in which references to non-SSA variables are restricted to copies to and from SSA variables.

15. An apparatus for optimizing code comprising:
a processor and a memory coupled thereto comprising:
a term rewriter;
a forward substitution mechanism which processes each expression as it is being parsed by the term rewriter, wherein said forward substitution mechanism operates on SSA GET expressions, recursively traversing the chain of SSA GET/PUT pairs associated with an SSA GET expression in the intermediate program representation until a terminating expression is reached; and
a mechanism for storing expressions forwarded using said forward substitution mechanism;
the term rewriter comprising a term comparing mechanism to determine whether a term rewriting rule exists for said expression, and a term rewriting mechanism to rewrite said expression in the intermediate program representation according to said rule.

16. The apparatus of claim 15 wherein the term comparing mechanism compares the form of said expression against forms of expressions in the term rewriter for which rewriting rules exist.

17. The apparatus of claim 16 wherein the forward substitution mechanism selectively does not perform said forward substitution for some variables where the result of comparing parts of the form of said expression indicates that no rewriting rule exists for said expression.

18. The apparatus of claim 15 further comprising a normalizer to normalize the intermediate program representation to a form in which uses of variables and expressions can be safely forward substituted with associated definitions of said variables without affecting the logic of the intermediate program representation.

19. The apparatus of claim 18, wherein the normalizer normalizes the intermediate program representation by modifying each expression to a minimally nested form in which references to non-SSA variables are restricted to copies to and from SSA variables.

20. The apparatus of claim 18 wherein the term rewriting mechanism forward substitutes uses of variables in each expression with associated definitions of said variables,
said forward substitution taking place in the intermediate language representation.

21. The apparatus of claim 20 wherein the term rewriting mechanism rewrites said expression using said rule in the term rewriter to determine whether an alternative expression exists in the rewriter for said expression; and replaces said expression in the intermediate program language with said alternative expression if it exists.

22. The apparatus of claim 20 wherein the term rewriting mechanism rewrites said expression to a minimally nested form in which references to non-SSA variables are restricted to copies to and from SSA variables.

23. Apparatus for optimizing code comprising:
a term rewriter having
means for transparently forward substituting definitions of variables in each expression m an intermediate program representation as said expression is being parsed,
wherein said forwarding means operates on SSA GET expressions, recursively traversing the chain of SSA GET/PUT pairs associated with the expression m the intermediate program representation until a terminating expression is reached;
means for maintaining a set of expressions forwarded by said forwarding means;
means for determining whether a term rewriting rule exists for said expression; and
means for rewriting said expression in the intermediate program representation according to said rule.

24. The apparatus of claim 23, wherein the means for transparently forward substituting definitions of variables comprises means for comparing an expression to determine whether a term security rule exists for said expression.

25. The apparatus of claim 23, wherein the means for transparently forward substituting definitions of variables comprises means for comparing an expression to determine whether a term rewriting rule exists for said expression.

26. The method of claim 4, wherein normalizing the intermediate program representation further comprises:
determining whether a non-SSA PUT expression has a SSA GET as the only subexpression;
determining whether a SSA ADD expression has a SSA GET as the only subexpression; and
determining whether a SSA SUB expression has a SSA GET as the only subexpression.

27. The machine-readable medium of claim 12, wherein normalizing the intermediate program representation further comprises:
determining whether a non-SSA PUT expression has a SSA GET as the only subexpression;
determining whether a SSA ADD expression has a SSA GET as the only subexpression; and
determining whether a SSA SUB expression has a SSA GET as the only subexpression.

28. The apparatus of claim 18, wherein the normalizer further includes
a mechanism to determine whether a non-SSA PUT expression has a SSA GET as the only subexpression;
a mechanism to determine whether a SSA ADD expression has a SSA GET as the only subexpression; and
a mechanism to determine whether a SSA SUB expression has a SSA GET as the only subexpression.

* * * * *

UNITED STATES PATENT AND TRADEMARK OFFICE
CERTIFICATE OF CORRECTION

PATENT NO. : 7,140,006 B2 Page 1 of 1
APPLICATION NO. : 09/976220
DATED : November 21, 2006
INVENTOR(S) : Harrison, III et al.

It is certified that error appears in the above-identified patent and that said Letters Patent is hereby corrected as shown below:

In column 2, at line 48, delete "PUTV" and insert --PUT V--.
In column 9, at line 26, delete "m" and insert --in--.
In column 11, at line 8, delete "m" and insert --in--.
In column 11, at line 13, delete "m" and insert --in--.

Signed and Sealed this

Sixth Day of November, 2007

JON W. DUDAS
*Director of the United States Patent and Trademark Office*